United States Patent [19]

Felix et al.

[11] Patent Number: 5,530,078
[45] Date of Patent: Jun. 25, 1996

[54] PREPARATION OF A MODIFIED POLYTETRAFLUOROETHYLENE AND USE THEREOF

[75] Inventors: Bernd Felix, Burgkirchen; Klaus Hintzer, Kastl; Gernot Löhr, Burgkirchen, all of Germany

[73] Assignee: Hoechst Aktiengesellschaft, Frankfurt am Main, Germany

[21] Appl. No.: 324,879

[22] Filed: Oct. 18, 1994

[30]  Foreign Application Priority Data

Oct. 20, 1993 [DE]  Germany ............... 43 35 705.9

[51] Int. Cl.$^6$ ........................................... C08F 4/08
[52] U.S. Cl. ............................... 526/91; 526/247
[58] Field of Search ................................. 526/91

[56]  References Cited

U.S. PATENT DOCUMENTS

| | | |
|---|---|---|
| 3,142,665 | 7/1964 | Cardinal et al. . |
| 3,855,191 | 12/1974 | Doughty, Jr. et al. . |
| 4,078,134 | 3/1978 | Kuhls et al. . |
| 4,262,101 | 4/1981 | Hartwimmer et al. . |
| 4,338,237 | 7/1982 | Sulzbach et al. ............. 526/91 |
| 4,576,869 | 3/1986 | Malhotra . |
| 4,639,497 | 1/1987 | Knight et al. ................ 526/91 |
| 4,640,955 | 2/1987 | Malhotra . |

FOREIGN PATENT DOCUMENTS

| | | |
|---|---|---|
| 0170382 | 6/1985 | European Pat. Off. . |
| 1162897 | 8/1969 | United Kingdom ......... 526/91 |

OTHER PUBLICATIONS

European Search Report No. 94116301.6, dated Jan. 11, 1995.

*Primary Examiner*—Joseph L. Schofer
*Assistant Examiner*—N. Sarofim
*Attorney, Agent, or Firm*—Connolly and Hutz

[57]  ABSTRACT

Polymerizing tetrafluoroethylene with modifying amounts of a perfluoro(alkyl vinyl ether) at temperatures below 60° C. using permanganate or similar initiators by the suspension process and milling the raw polymer to an average particle size of from 10 to 50 μm gives molding powders which are suitable for the preform free-sintering technique.

9 Claims, No Drawings

PREPARATION OF A MODIFIED POLYTETRAFLUOROETHYLENE AND USE THEREOF

DESCRIPTION

The invention relates to a process for preparing a polytetrafluoroethylene (PTFE) modified with perfluoro(alkyl vinyl ether) (PAVE) units and the use thereof for the preform free-sintering technique. "Modified" PTFE means that the tetrafluoroethylene (TFE) polymer contains relatively small proportions of ether units, namely usually below 0.1 mol %, and that the copolymer, like the homopolymeric PTFE, is not processible from the melt. On the other hand, the content of ether units in the polymer must be sufficiently high for the tendency to crystallization from the melt to be inhibited and for the amorphous content to be increased within certain limits. In this way, the good mechanical properties such as tensile strength and elongation at break of the unmodified PTFE are achieved even at significantly lower molecular weights.

The lower molecular weights of the modified products are evident in a melt viscosity by the Ajroldi method (U.S. Pat. No. 3 855 191, column 8) of from about 1 to 100 GPas, while the melt viscosity of the unmodified polymers for comparably good mechanical properties is more than 300 GPas.

This drastic lowering of the melt viscosity improves the properties of the shaped parts produced from these modified molding powders. Since the particles of the molding powder melt together more easily, the shaped parts contain fewer pores and consequently have an improved electrical breakdown resistance; in addition, the creep resistance is almost doubled. In particular, however, the weldability of the shaped parts is considerably improved.

As already mentioned above, the invention also provides for the use of the modified PTFE for the preform free-sintering technique. For this purpose, good millability of the raw polymer is imperative. In contrast thereto, ram extrusion requires a hard, i.e. poorly millable, grain and good flowability.

The invention provides a process for preparing polymers of TFE containing from 0.02 to 0.25% by weight of PAVE units having from 1 to 4 carbon atoms in the perfluoroalkyl chain, which comprises polymerizing the monomers by the suspension process in aqueous medium using an initiator containing manganese in a higher oxidation state at a temperature below 60° C. For use according to the invention, the raw polymer thus obtained is milled to an average particle size of from 10 to 50 μm.

The preferred PAVE is perfluoro(n-propyl vinyl ether), hereinafter referred to as PPVE.

The polymerization temperature is preferably in a range from 10° to 50° C., the polymerization pressure is in the range from 4 to 25 bar, in particular from 5 to 15 bar.

Suitable initiators are salts of permanganic, manganic and manganous acid. Preference is given to the permanganates, in particular the alkali metal permanganates. They are advantageously used in combination with a soluble oxalate such as ammonium oxalate or an alkali metal oxalate.

Further preferred embodiments of the invention are illustrated below in more detail.

The preparation of copolymers comprising TFE and PAVE units using permanganate and similar initiators is already known. Thus, U.S. Pat. No. 4,262,101 discloses the preparation of a terpolymer by copolymerization of TFE with from 1 to 6 mol % of PAVE and from 5 to 25 mol % of hexafluoropropene in the presence of a chain transfer agent. The polymerization temperature can be from 10 to 150° C., preferably from 10 to 50° C. The terpolymer thus obtained is processible from the melt.

U.S. Pat. No. 4,078,134 discloses the polymerization of TFE with only very small amounts of PAVE, namely from 0.0004 to 0.0029 mol %. The preferred polymerization temperature is from 10° to 35° C., in the examples using potassium permanganate as initiator it is 15° or 25° C. The products thus obtained are distinguished both from unmodified PTFE and from the products having higher proportions of modifier, namely above 0.0029 mol% (column 4, lines 18 to 68). They are suitable for the production of shaped bodies by forming, sintering and, in particular, ram extrusion. As a result, they cannot meet the specific demands which are nowadays made of a molding powder for the preform free-sintering technique.

The preparation of a TFE polymer which is modified with PAVE and is suitable for the preform free-sintering technique is known from U.S. Pat. No. 3,855,191. Here, the polymerization is carried out at from 50° to 100° C., with inorganic persulfates being preferred as initiators. Although redox initiator systems are specified, salts of manganese acids are not mentioned. The desired low amorphous content of below 8% by weight, preferably below 6.5% by weight, is achieved by the use of a fluorinated dispersant which has no telogenic action. However, it has been found that these dispersants lead to lump formation during the polymerization, particularly at lower temperatures, as they are used according to the invention. Thus, a controlled reaction up to a desired solids content of about 30% by weight is no longer ensured.

It has furthermore been found that the specified lump formation occurs when using the fluorinated dispersants, particularly at a relatively low salt content in the polymerization liquid. However, the process of the invention allows low salt contents which not only simplify the disposal of waste water, but also have a positive influence on the product properties.

The polymerization carried out according to the invention gives a raw polymer which is very readily millable. The considerably improved millability is evident in a more than doubled throughput and/or a lower energy consumption of the mill.

It has furthermore been found that the ready millability of the raw polymers is coupled with advantageous mechanical and electrical properties. The molding powders thus obtained have a high pressability or deformability. For the purposes of the present invention, this means the alteration of the gravimetrically determined densities of the molding powder pressed under various high pressures without sintering, i.e. in the form of the so-called green body (U.S. Pat. No. 3,245,972, column 2, lines 28 to 37). Increasing pressability or deformability improves the technical properties of the sintered material, because the contact between the individual particles is thereby more readily ensured.

The shaped bodies produced from the products obtained according to the invention have a combination of valuable properties, namely, in particular, a high tensile strength with good elongation at break and a high electrical breakdown resistance.

The good millability and also the improved properties of the final products is probably caused by an improved grain structure of the polymer. This is evident in a drastic increase in the specific surface area. It has been found that this grain improvement is significantly influenced in the desired direction by relatively high TFE pressures, for example in the range from 15 to 25 bar. However, for technical reasons, a pressure range from 5 to 15 bar is preferred, since a higher TFE pressure leads to a higher loss of the expensive PAVE and, in addition, the explosion risk inherent in the system is increased at high pressures.

The desired influence on the grain structure is, according to the invention, achieved principally by means of the low polymerization temperatures. As mentioned, a low salt content in the polymerization medium is also advantageous. With the initiator used according to the invention, the polymerization temperature can be reduced to about 10° C., without the space-time yield (at comparable molecular weight and the same degree of modification) being unjustifiably reduced. This is surprising since the polymerization is considerably slowed by PAVE.

The initiators of the invention have a strongly temperature-dependent decomposition rate. Therefore, with falling polymerization temperature an increasing proportion of the total amount of initiator is initially charged at the beginning of the polymerization and the remainder is metered in, preferably continuously over the whole duration of the polymerization. The metered addition is advantageously controlled in such a way that the polymerization rate for a constant degree of incorporation of the PAVE over time does not decrease.

The polymerization can also be carried out by the process known from U.S. Pat. No. 5,153,285, in which a mixture of TFE and inert gas is injected under pressure prior to the polymerization and the total pressure of the injected mixture is from 5 to 50 bar, with the concentration of the TFE in this mixture being from 30 to 70 mol % and being maintained in this range by appropriate further injection during the polymerization.

If a free-flowing product is desired, the milled product obtained according to the invention can be granulated in a known manner. The agglomeration process known from U.S. Pat. No. 4,439,385 is suitable.

The invention is illustrated by the following examples. Percentages are by weight.

EXAMPLES

A 150 l reactor is charged with 100 l of deionized water and the amount of ammonium oxalate (AmOx) given in Table 1 is added. The contents of the reactor are freed of atmospheric oxygen by alternate evacuation and flushing with nitrogen. TFE is injected up to a pressure of 10 bar and the total pressure is increased to 15 bar by injection of nitrogen. This pressure is kept constant over the whole polymerization time by further injection of TFE. The amount of PPVE given in Table 1 is metered into the reactor and the contents of the reactor are brought to the temperature given in Table 1. This temperature is likewise kept constant over the whole duration of the polymerization. The polymerization is started by rapid metered addition (within 5 minutes) of the amount of potassium permanganate given in Table 1 under "initiation" dissolved in 300 ml of water. The reaction starts virtually instantaneously. After about 20 minutes, an aqueous solution of the amount of potassium permanganate given in Table 1 and also the further amount of PPVE are continuously metered in.

After the desired amount of TFE has been introduced, the reaction is stopped by the metering-in of initiator, PPVE and TFE being interrupted. After a further period of about 20 minutes, the pressure drops to about 6 bar. The contents of the reactor are then cooled to room temperature and are substantially freed of the residual monomers by repeated evacuation.

The product obtained is washed three times with deionized water, dried for 10 hours at 220° C. and milled in a spiral-jet mill. The average particle size $d_{50}$ of the milled product is about 20 µm. The further properties of the milled powder are given in Table 1. These properties were determined as follows:

The amorphous content is determined by IR spectroscopy on 100 µm films by measurement of the absorption at 778 and 2353 $cm^{-1}$ in accordance with the method given in U.S. Pat. No. 3 855 191, column 5.

The PPVE content is likewise determined by IR spectroscopy on 100 µm films by measurement of the absorption at 995 and 2353 $cm^{-1}$ in accordance with the relationship % PPVE content=$0.95 \cdot A_{995}/A_{2353}$.

The specific surface area is determined by measurement of the nitrogen adsorption in accordance with the method described by F. M. Nelson and F. T. Eggertson [Anal. Chem. 30, 1387 (1958)].

The millability of the raw polymer in the spiral-jet mill was measured by the throughput amount per hour at a milling-air pressure of 6 bar and with the same proportion of particles larger than 33 µm, measured by sieving.

The molecular weight given in Table 1 (number average) was estimated, under the plausible assumption that the initiator used is practically quantitatively reacted under the reaction conditions indicated, in accordance with the following relationship:

$M_n = 2 \cdot 100 \cdot m_p/I_0$, where $m_p$ is the amount of TFE reacted in mole, $I_0$ is the amount of initiator used in mole, the factor 100 is the molecular weight of TFE and the factor 2 represents a combination termination.

The standard specific gravity is determined in accordance with ASTM testing standard D-1457-69.

Table 1 also shows, under "final properties", the tensile strength (TS), the elongation at break (EB) and the electrical breakdown resistance (EBR). These properties are determined on films which are produced as follows:

a) washing of the raw polymer with deionized water, b) predrying in a fluidized bed at temperatures up to 130° C., c) further drying for 4 hours at 220° C., d) milling in an air-jet mill to a $d_{50}$ of about 20 µm, e) pressing at 350 bar into a cylindrical, 13 kg block about 208 mm in both height and diameter, f) sintering at 380° C. in accordance with a temperature program and g) shaving off a film having a thickness of 100 µm in 200 µm steps.

Samples of the 100 µm thick films from the middle zone of the block are used for determining the tensile strength and elongation to break in accordance with DIN 53455 (strip method) and the electrical breakdown resistance in accordance with DIN 53481.

Table 2 shows comparative examples. Since the disintegration rate of the initiators used according to the invention becomes so high at temperatures above 60° C. that a readily reproducible polymerization can be achieved only with difficulty, ammonium persulfate (APS) was used as initiator. Besides ammonitunoxalate, ammonium carbonate (AmCb)

was also used as buffer substance. The molecular weight was estimated using the following relationship:

$$M_n = 100 \cdot m_p / [I_0(1-e-k_d \cdot t)]$$

where $m_p$ is the molar amount of TFE reacted, $I_0$ is the amount of initiator used in mole, $k_d$ is the decomposition constant of ammonium persulfate and t is the polymerization time. This relationship assumes that the persulfate disintegrates into two initiator free radicals.

The value used for the disintegration constant $k_d$ was $1.2 \cdot 10^{-5}$ sec$^{-1}$ at 70° C. and $0.5 \cdot 10^{-5}$ sec$^{-1}$ at 63° C. [I. M. Kolthoff, I. H. Miller, J. Am. Chem. Soc. 37 (1951) 3055].

A comparison of the average values from the Tables 1 and 2 gives the following property profile:

The product of the process of the invention has, at comparable molecular weight and degree of modification, a significantly higher specific surface area, a drastically improved millability, an electrical breakdown resistance increased by 30% and a tensile strength increased by 10 N/mm$^2$, with only slightly decreased elongation at break.

TABLE 1

| | | | | Process parameters | | | | |
|---|---|---|---|---|---|---|---|---|
| Ex. | Temperature [°C.] | AmOx [g] | KMnO$_4$ initiation [mg] | KMnO$_4$ subsequently metered in [mg] | TFE [kg] | PPVE initially charged [g] | Metered addition rate [g] PPVE/ [kg] TFE | Run time [h] |
| 1 | 55 | 1.5 | 50 | 780 | 42.0 | 30.0 | 2.5 | 3.9 |
| 2 | 55 | 1.5 | 35 | 800 | 50.0 | 35.0 | 2.0 | 5.4 |
| 3 | 40 | 1.5 | 30 | 780 | 50.7 | 30.0 | 2.5 | 5.3 |
| 4 | 40 | 1.5 | 40 | 820 | 51.3 | 30.0 | 2.5 | 5.2 |
| 5 | 40 | 3.0 | 40 | 620 | 51.0 | 30.0 | 2.5 | 4.0 |
| 6 | 40 | 1.5 | 300 | 570 | 52.5 | 70.0 | 1.0 | 4.5 |
| 7 | 40 | 1.5 | 300 | 520 | 52.4 | 70.0 | 1.0 | 4.8 |
| 8 | 40 | 1.5 | 70 | 800 | 48.4 | 60.0 | 2.0 | 5.0 |
| 9 | 35 | 1.5 | 20 | 730 | 50.8 | 30.0 | 2.5 | 5.1 |
| 10 | 35 | 5.0 | 30 | 910 | 51.7 | 45.0 | 2.5 | 4.9 |
| 11 | 20 | 1.5 | 300 | 570 | 52.0 | 60.0 | 2.5 | 5.1 |

| | Powder properties | | | | | Standard | Final properties | | |
|---|---|---|---|---|---|---|---|---|---|
| Ex. | PPVE incorporation [%] | Amorphous content [%] | Specific surface area [m$^2$/g] | Millability [kg/h] | $M_n \times 10^{-7}$ [g/mol] | specific gravity [g/cm$^3$] | TS [N/mm$^2$] | EB [%] | EBR [kV/mm] |
| 1 | 0.08 | 5.4 | 4.3 | 10 | 1.6 | 2.177 | 45.8 | 635 | 119 |
| 2 | 0.07 | 3.6 | 3.7 | 12 | 1.9 | 2.163 | 46.4 | 665 | 121 |
| 3 | 0.09 | 5.9 | 2.7 | 11 | 2.0 | 2.159 | 44.0 | 605 | 130 |
| 4 | 0.10 | 6.0 | 2.9 | 12 | 1.9 | 2.158 | 43.6 | 590 | 120 |
| 5 | 0.08 | 5.9 | 3.2 | 13 | 2.5 | 2.160 | 42.2 | 615 | 129 |
| 6 | 0.09 | 6.2 | 3.1 | 12 | 1.9 | 2.162 | 47.3 | 625 | 130 |
| 7 | 0.08 | 6.3 | 3.3 | 14 | 2.0 | 2.161 | 48.2 | 640 | 139 |
| 8 | 0.08 | 5.7 | 2.9 | 11 | 1.8 | 2.163 | 42.4 | 670 | 120 |
| 9 | 0.09 | 5.7 | 3.3 | 11 | 2.2 | 2.157 | 51.5 | 595 | 138 |
| 10 | 0.10 | 6.8 | 3.4 | 12 | 1.8 | 2.161 | 46.5 | 625 | 130 |
| 11 | 0.09 | 7.6 | 3.8 | 10 | 1.9 | 2.155 | 48.9 | 555 | 134 |

TABLE 2

| | | Process parameters | | | | | | Powder properties | |
|---|---|---|---|---|---|---|---|---|---|
| Comp. Ex. | Temperature [°C.] | Buffer substance amount/type | APS [g] | TFE [kg] | PPVE initially charged [g] | Metered addition rate [g] PPVE/ [kg] TFE | Run time [h] | PPVE incorporation [%] | Amorphous content [%] |
| 1 | 70 | 10 g/AmCb | 5.0 | 50 | 35.0 | 1.7 | 5.3 | 0.09 | 5.8 |
| 2 | 70 | 20 g/AmCb | 5.0 | 50 | 70.0 | 0.6 | 5.2 | 0.10 | 6.3 |
| 3 | 70 | 20 g/AmCb | 4.0 | 50 | 60.0 | 0.7 | 5.2 | 0.10 | 6.1 |
| 4 | 70 | 3.2 g/AmOx | 3.8 | 50 | 35.0 | 1.7 | 5.0 | 0.09 | 7.1 |
| 5 | 70 | 7.5 g/AmOx | 4.6 | 50 | 70.0 | 0.6 | 5.0 | 0.10 | 7.7 |
| 6 | 63 | 7.0 g/AmOx | 7.6 | 50 | 60.0 | 0.7 | 4.7 | 0.11 | 7.8 |
| 7 | 63 | 7.0 g/AmOx | 7.6 | 50 | 35.0 | 1.7 | 4.7 | 0.09 | 7.6 |
| 8 | 63 | 7.5 g/AmOx | 7.6 | 50 | 70.0 | 0.6 | 4.7 | 0.12 | 7.5 |

TABLE 2-continued

| | Powder properties | | | | Final properties | | |
|---|---|---|---|---|---|---|---|
| Comp. Ex. | Specific surface area [m²/g] | Milla- bility [kg/h] | $M_n \times 10^{-7}$ [g/mol] | Standard specific gravity [g/cm³] | TS [N/mm²] | EB [%] | EBR [kV/mm] |
| 1 | 1.4 | 5.3 | 1.3 | 2.171 | 35.6 | 675 | 94 |
| 2 | 1.5 | 5.5 | 1.3 | 2.17 | 36.1 | 655 | 98 |
| 3 | 1.4 | 5.1 | 1.7 | 2.169 | 34.8 | 695 | 95 |
| 4 | 1.5 | 4.3 | 1.8 | 2.17 | 32.8 | 705 | 99 |
| 5 | 1.5 | 4.1 | 1.5 | 2.173 | 36.6 | 690 | 101 |
| 6 | 1.3 | 5.0 | 1.9 | 2.171 | 35.4 | 720 | 99 |
| 7 | 1.4 | 4.8 | 1.9 | 2.169 | 37.3 | 665 | 97 |
| 8 | 1.3 | 5.1 | 1.9 | 2.164 | 34.5 | 690 | 103 |

We claim:

1. A process for preparing a polymer of tetrafluoroethylene containing from 0.02 to 0.25% by weight of units of a perfluoro(alkyl vinyl ether) having from 1 to 4 carbon atoms in the perfluoroalkyl chain, which comprises polymerizing the monomers in aqueous medium by suspension process at temperatures below 60° C. with a salt of permanganic, manganic, or manganous acid as initiator.

2. The process as claimed in claim 1, herein the initiator is a salt of permanganic acid.

3. The process as claimed in claim 1, wherein the ether is perfluoro(n-propyl vinyl ether).

4. The process as claimed in claim 1, wherein the initiator is a salt of manganic acid.

5. The process as claimed in claim 1, wherein the initiator is a salt of manganous acid.

6. The process as claimed in claim 1, wherein the initiator is a salt of an alkali metal permanganic acid.

7. The process as claimed in claim 1, wherein the initiator is used in combination with a soluble oxalate.

8. The process as claimed in claim 7, wherein the soluble oxalate is ammonium oxalate.

9. The process as claimed in claim 7, wherein the soluble oxalate is an alkali metal oxalate.

* * * * *

UNITED STATES PATENT AND TRADEMARK OFFICE
CERTIFICATE OF CORRECTION

PATENT NO.   : 5,530,078
DATED        : June 25, 1996
INVENTOR(S)  : Bernd Felix et al It is certified that error appears in the above-indentified patent and that said Letters Patent is hereby corrected as shown below:

Column 7, line 26, "herein" should be --wherein--.

Signed and Sealed this

Twenty-second Day of October, 1996

Attest:

BRUCE LEHMAN

Attesting Officer    Commissioner of Patents and Trademarks